(12) United States Patent
Bilek et al.

(10) Patent No.: US 11,472,567 B2
(45) Date of Patent: Oct. 18, 2022

(54) SYSTEMS AND METHODS FOR PRESENTING ENVIRONMENT INFORMATION ON A MISSION TIMELINE

(71) Applicant: HONEYWELL INTERNATIONAL INC., Morris Plains, NJ (US)

(72) Inventors: Jan Bilek, Brno (CZ); Petr Talla, Brno (CZ); Barbara Holder, Redmond, WA (US); Girish Benakatti, Bangalore (IN); Martina Tučková, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 100 days.

(21) Appl. No.: 17/002,904

(22) Filed: Aug. 26, 2020

(65) Prior Publication Data
US 2022/0017232 A1   Jan. 20, 2022

(30) Foreign Application Priority Data
Jul. 14, 2020 (IN) ............................ 202011029904

(51) Int. Cl.
*B64D 43/00* (2006.01)
*G01W 1/06* (2006.01)
(Continued)

(52) U.S. Cl.
CPC ............ *B64D 43/00* (2013.01); *G01S 13/953* (2013.01); *G01W 1/06* (2013.01); *G01W 1/10* (2013.01);
(Continued)

(58) Field of Classification Search
CPC .... B64D 43/00; B64D 43/02; B64D 45/0005; B60Q 2300/31; B60Q 2300/312;
(Continued)

(56) References Cited

U.S. PATENT DOCUMENTS

2002/0039072 A1* 4/2002 Gremmert ............... G01S 7/003
340/945
2013/0268878 A1 10/2013 Le Roux et al.
(Continued)

FOREIGN PATENT DOCUMENTS

EP   2985747 A1 * 2/2016 ............. G01W 1/10
EP   3048424 A1   12/2016
(Continued)

*Primary Examiner* — Daniel R Miller
*Assistant Examiner* — Eric Sebastian Von Wald
(74) *Attorney, Agent, or Firm* — Lorenz & Kopf, LLP (57) ABSTRACT

Methods and systems for automating processes of receiving, prioritizing, and grouping weather data into a weather event, extent of weather event, and an associated duration for presentation on a displayed mission timeline in an aircraft having a flight plan (FP). The method includes: receiving, by a controller circuit, weather data, aircraft state data, and aircraft system status data; identifying a weather phenomenon that impacts the FP and creating an information structure for the weather phenomenon, the information structure including at least a type, a subtype, a severity, a start of impact and an end of impact. The method also includes presenting a weather event indicator overlaid on the mission timeline to indicate the weather phenomenon. The rendering of the weather event indicator on the mission timeline additionally depicts on the mission timeline: a start, an end, and duration of the weather event.

18 Claims, 5 Drawing Sheets

(51) Int. Cl.
*G01S 13/95* (2006.01)
*G01W 1/10* (2006.01)
*G01W 1/00* (2006.01)

(52) U.S. Cl.
CPC ............... *G01W 2001/003* (2013.01); *G01W 2001/006* (2013.01)

(58) Field of Classification Search
CPC ...... G01S 13/953; G01S 13/88; G01S 13/882; G01S 13/885; G01S 13/886; G01S 13/89; G01S 13/90; G01S 13/95; G01W 1/06; G01W 1/10; G01W 2001/003; G01W 2001/006; G01W 1/02; G01W 1/12; G01W 1/14; G01W 1/16; G01W 1/17; G08G 5/003; G08G 5/0039; G08G 5/0047; G08G 5/0082; G08G 5/0091; G10H 2250/415

See application file for complete search history.

(56) References Cited

U.S. PATENT DOCUMENTS

| | | | |
|---|---|---|---|
| 2015/0142224 A1 | 5/2015 | Latorre-Costa et al. | |
| 2016/0093219 A1* | 3/2016 | Bailey | G08G 5/0021 701/120 |
| 2016/0180718 A1* | 6/2016 | Shapiro | G08G 5/0091 701/418 |
| 2017/0183105 A1* | 6/2017 | Fournier | B64D 45/00 |
| 2018/0238996 A1* | 8/2018 | Gurusamy | G01S 7/062 |
| 2019/0164440 A1* | 5/2019 | Briand | G08G 5/0047 |
| 2019/0304314 A1* | 10/2019 | Hochwarth | G08G 5/0091 |
| 2020/0168104 A1* | 5/2020 | Holder | G08G 5/0039 |
| 2020/0173809 A1* | 6/2020 | Turner | G01C 23/005 |

FOREIGN PATENT DOCUMENTS

| | | |
|---|---|---|
| EP | 3660461 A1 | 11/2019 |
| WO | 2016/099619 A1 | 6/2016 |

\* cited by examiner

SYSTEMS AND METHODS FOR PRESENTING ENVIRONMENT INFORMATION ON A MISSION TIMELINE

CROSS REFERENCE TO RELATED APPLICATION

This application claims priority to Indian Provisional Patent Application No. 202011029904, filed Jul. 14, 2020, the entire content of which is incorporated by reference herein.

TECHNICAL FIELD

The following disclosure relates generally to aircraft display systems, and, more particularly, to systems and methods for presenting environment information on a mission timeline on an aircraft display system.

BACKGROUND

An integral part of some available aircraft display systems is an interactive map application that offers a means of navigation and provides a possibility to retrieve and review multiple additional information sources, including environment data such as weather, airspace restrictions and notices to airmen (NOTAMs). These available aircraft display systems may present data in the form of one or more interactive map layers that can be overlaid on top of each other. A trend in aircraft display systems is to offer a mission-oriented approach, which provides a timeline and places graphic symbols along the timeline to indicate required activities and situations requiring attention.

An important map layer for aircraft display systems provides weather information. Some mission timeline solutions may utilize a graphic symbol alongside the mission timeline to indicate a weather event on the planned flight plan (FP). However, a technical problem is presented in that a pilot or crew may need to know, not only that there is a thunderstorm ahead on the FP, but its significance (e.g., level of severity and additional details that may impact the aircraft).

Accordingly, technically improved systems and methods for presenting environment information on a mission timeline on an aircraft display system are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a flight plan (FP) display system on an aircraft for automating processes of receiving, prioritizing, and grouping weather data into a weather event with an associated extent for presentation on a displayed mission timeline, the system including a controller circuit with a processor configured by programming instructions on non-transient computer readable media, the controller circuit configured to: receive weather data from at least one weather source; reference aircraft state data and aircraft system status data; and identify a weather phenomenon that impacts the FP by processing the weather data with the aircraft state data, aircraft system status data, and the FP; create an information structure for the weather phenomenon, the information structure including a type, a subtype, a severity, a start of impact and an end of impact; present a weather event indicator overlaid on the mission timeline to depict the weather phenomenon; present an alphanumeric notice of the weather event next to the weather event indicator; and depict an extent of the weather event with a beginning of the weather event indicator and an end of the weather event indicator; wherein: the beginning of the weather event indicator is aligned with a beginning of a flight segment when the start of impact occurs at or within a first prescribed snap-to start percent of the flight segment; the beginning of the weather event indicator is placed after the beginning of the flight segment when (i) the start of impact occurs after the first prescribed snap-to start percent of the flight segment (ii) the end of the weather event indicator occurs prior to a last prescribed snap-to end percent of the flight segment; the beginning of the weather event indicator is placed at a center of the flight segment when the start of impact occurs after the prescribed snap-to start percent of the flight segment; the end of the weather event indicator is aligned with an ending of the flight segment when the end of impact occurs at or within a final prescribed snap-to end percent of the flight segment; and the end of the weather event indicator is placed at the center of the weather event indicator or before the ending of the flight segment when the end of impact occurs prior to the last prescribed snap-to end percent of the flight segment.

In an embodiment, a method for automating processes of receiving, prioritizing, and grouping weather data into a weather event with an associated extent for presentation on a displayed mission timeline in an aircraft having a flight plan (FP) is provided. The method including: receiving, by a controller circuit with a processor configured by programming instructions, weather data from at least one weather source; referencing, by the controller circuit, aircraft state data and aircraft system status data; and identifying, by the controller circuit, a weather phenomenon that impacts the FP by processing the weather data with the aircraft state data, the aircraft system status data, and the FP; creating an information structure for the weather phenomenon, the information structure including a type, a subtype, a severity, a start of impact and an end of impact; presenting a weather event indicator overlaid on the mission timeline to depict the weather phenomenon; presenting an alphanumeric notice of the weather event next to the weather event indicator; and depicting an extent of the weather event with a beginning of the weather event indicator and an end of the weather event indicator; wherein: the beginning of the weather event indicator is aligned with a beginning of a flight segment when the start of impact occurs at or within a first prescribed snap-to start percent of the flight segment; the beginning of the weather event indicator is placed after the beginning of the flight segment when (i) the start of impact occurs after the first prescribed snap-to start percent of the flight segment (ii) the end of the weather event indicator occurs prior to a last prescribed snap-to end percent of the flight segment; the beginning of the weather event indicator is placed at a center of the flight segment when the start of impact occurs after the prescribed snap-to start percent of the flight segment; the end of the weather event indicator is aligned with an ending of the flight segment when the end of impact occurs at or within a final prescribed snap-to end percent of the flight segment; and the end of the weather event indicator is placed at the center of the weather event indicator or before the ending of the flight segment when the end of impact occurs prior to the last prescribed snap-to end percent of the flight segment.

Also provided is a mission timeline display system displaying a mission timeline for a flight plan (FP) of an aircraft. The mission timeline display system including: a significant environment processing module configured to: communicate with aircraft ownship data sources and external data sources using a communications circuit; and identify a weather phenomenon that impacts the FP; a creation of information structure module configured to operate on the weather phenomenon and create an information structure therefrom; and a display processing module configured to operate on the information structure to generate and display on the mission timeline display: a weather event indicator, overlaid on the mission timeline to depict the weather phenomenon; and an alphanumeric notice of the weather event, next to the weather event indicator; and wherein the weather event has an extent indicated with a beginning of the weather event indicator and an end of the weather event indicator; wherein: the beginning of the weather event indicator is aligned with a beginning of a flight segment when the start of impact occurs at or within a first prescribed snap-to start percent of the flight segment; the beginning of the weather event indicator is placed after the beginning of the flight segment when (i) the start of impact occurs after the first prescribed snap-to start percent of the flight segment (ii) the end of the weather event indicator occurs prior to a last prescribed snap-to end percent of the flight segment; the beginning of the weather event indicator is placed at a center of the flight segment when the start of impact occurs after the prescribed snap-to start percent of the flight segment; the end of the weather event indicator is aligned with an ending of the flight segment when the end of impact occurs at or within a final prescribed snap-to end percent of the flight segment; and the end of the weather event indicator is placed at the center of the weather event indicator or before the ending of the flight segment when the end of impact occurs prior to the last prescribed snap-to end percent of the flight segment.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, a mission-oriented approach in aircraft display systems generally provides a mission timeline and places graphic symbols along the timeline at locations that indicate when required activities should be performed and when situations requiring attention may occur. Some mission timeline solutions may place a graphic symbol alongside the mission timeline of the planned flight plan (FP) to indicate a weather event. However, a technical problem is presented in that a pilot or crew may need to know more than simply that there is a weather event ahead on the FP, such as, its significance (e.g., level of severity, extent/duration, and potential impact to the aircraft).

The present disclosure provides a technical solution to the limitations of available solutions, in the form of systems and methods for providing environment information on a mission timeline. The provided systems and methods automate the processes of receiving, prioritizing, and grouping weather data into a weather event and event extent with an associated duration for presentation on a displayed mission timeline on an aircraft flight plan (FP) display system. The provided systems and methods generate a weather event indicator that, by its size and placement on the mission timeline, visually communicates a start, and end, and an extent/duration of the weather event.

Figure 1:
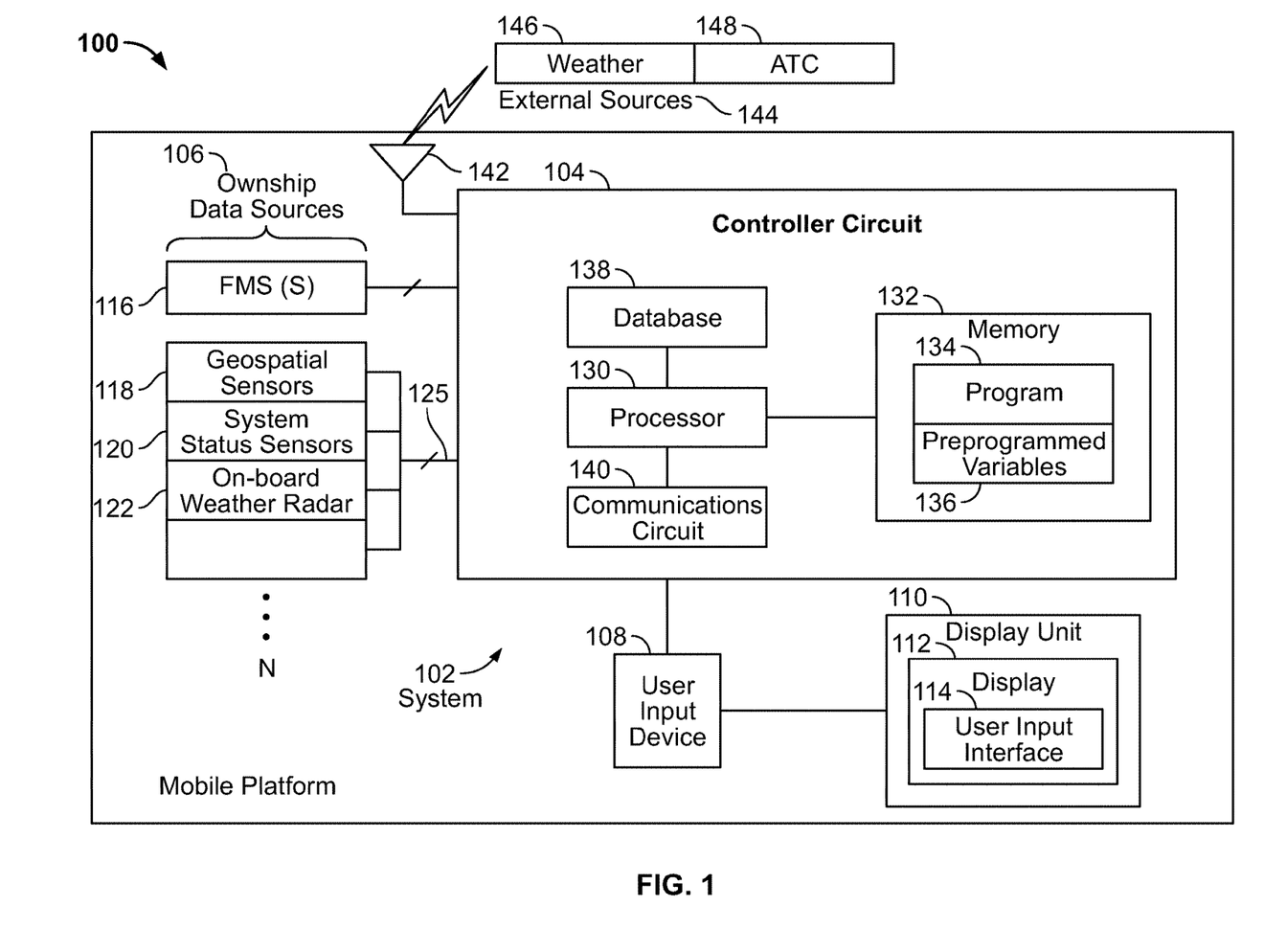
FIG. 1 is a block diagram of a system for presenting environment information on a mission timeline on an aircraft display system, as illustrated in accordance with an exemplary embodiment of the present disclosure.

FIG. 1 is a block diagram of a system 102 for automating the process of receiving, prioritizing, and grouping weather data into a weather event with an event extent an associated duration for presentation on a displayed mission timeline (shortened hereinafter to "system 102"), as illustrated in accordance with an exemplary and non-limiting embodiment of the present disclosure. The system 102 may be utilized onboard a mobile platform 100 to provide enhanced weather alerting, as described herein. In various embodiments, the mobile platform is an aircraft 100, which carries or is equipped with the system 102. As schematically depicted in FIG. 1, system 102 may include the following components or subsystems, each of which may assume the form of a single device, system on chip (SOC), or multiple interconnected devices: a controller circuit 104 operationally coupled to: at least one display unit 110; computer-readable storage media or memory 132; a user input interface 114, and ownship data sources 106 including one or more flight management system computers (FMS computers 116), aircraft system status sensors and geospatial sensors. In various embodiments, the system 102 may be separate from or integrated within: a FMS computer 116 and/or a flight control system (FCS). The system 102 may also contain a communications circuit 140 and an antenna 142, which may wirelessly transmit data to and receive real-time data and signals from various external sources 144, including, each of: weather source(s) 146, air traffic control (ATC 148), and the like.

Although schematically illustrated in FIG. 1 as a single unit, the individual elements and components of the system 102 can be implemented in a distributed manner utilizing any practical number of physically distinct and operatively interconnected pieces of hardware or equipment. When the system 102 is utilized as described herein, the various components of the system 102 will typically all be located onboard the Aircraft 100.

The term "controller circuit," as appearing herein, broadly encompasses those components utilized to carry-out or otherwise perform the processes and/or support the processing functionalities of the system 102. Accordingly, controller circuit 104 can encompass or may be associated with a programmable logic array, and an application specific integrated circuit or other similar firmware, as well as any number of individual processors, flight control computers, navigational equipment pieces, computer-readable memories (including or in addition to memory 132), power supplies, storage devices, interface cards, and other standardized components. In various embodiments, controller circuit 104 embodies one or more processors operationally coupled to data storage having stored therein at least one firmware or software program (generally, a program product or program of computer-readable instructions that embody an algorithm) for carrying-out the various process tasks, calculations, and control/display functions described herein. During operation, the controller circuit 104 may execute an algorithm for automating the process of receiving, prioritizing, and grouping weather data into a weather event with an associated duration for presentation on a displayed mission timeline for an aircraft 100, to thereby perform the various process steps, tasks, calculations, and control/display functions described herein. In various embodiments, the algorithm is embodied as at least one firmware or software program (e.g., program 134).

Communications circuit 140 is configured to provide a real-time bidirectional wired and/or wireless data exchange for the processor 130 with the ownship data sources 106, the user input device 108, the display unit 110, and the external sources 144 to support operation of the system 102 in embodiments. In various embodiments, the communications circuit 140 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 140 is integrated within the controller circuit 104 as shown in FIG. 1, and in other embodiments, the communications circuit 140 is external to the controller circuit 104.

A variety of ownship data sources 106 may be operationally coupled to the controller circuit 104. For example, one or more flight management system (FMS) 116 computers may bidirectionally communicate with the controller circuit 104. In various embodiments, the FMS 116 may provide a flight plan (FP). Flight parameter sensors and geospatial sensors 118 supply various types of aircraft state data or measurements to controller circuit 104 during aircraft flight. In various embodiments, the aircraft state data supplied by the geospatial sensors 118 include, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. Aircraft system status sensors 120 may provide aircraft system status data, such as, engine status, fuel status, a current aircraft configuration (e.g., spoiler/speed brake configuration), and the like. On-board weather radar sensors 122 can provide weather data associated with the immediate surroundings of the aircraft 100. Often, the FMS 116 and onboard sensor systems provide data and information on a communication bus 125 and the controller circuit 104 receives the sensor data and information therefrom.

External sources 144 may communicate with the controller circuit 104, for example, wirelessly, and via antenna 142. External sources include external weather sources 146, air traffic control (ATC) 148, and traffic data sources. With respect to the present invention, external weather sources 146 may be any combination of one or more of meteorological weather information, such as, uplink weather (XM/SXM, GDC/GoDirect Weather), NOTAM/D-NOTAM, TAF, D-ATIS.

A display unit 110 can include any number and type of image generating devices on which one or more avionic displays 112 may be produced. When the system 102 is utilized for a manned Aircraft, display unit 110 may be affixed to the static structure of the Aircraft cockpit as, for example, a Head Down Display (HDD) or Head Up Display (HUD) unit. Alternatively, display unit 110 may assume the form of a movable display device (e.g., a pilot-worn display device) or a portable display device, such as an Electronic Flight Bag (EFB), a laptop, or a tablet computer carried into the Aircraft cockpit by a pilot.

At least one avionic display 112 is generated on display unit 110 during operation of the system 102; the term "avionic display" defined as synonymous with the term "aircraft-related display" and "cockpit display" and encompasses displays generated in textual, graphical, cartographical, and other formats. The system 102 can generate various types of lateral and vertical avionic displays on which map views and symbology, text annunciations, and other graphics pertaining to flight planning are presented for a pilot to view. In various embodiments, the display unit 110 is configured to continuously render at least a lateral display showing the Aircraft 100 at its current location within the map data. The avionic display 112 generated and controlled by the system 102 can include a user input interface 114, including graphical user interface (GUI) objects and alphanumerical displays of the type commonly presented on the screens of MCDUs, as well as Control Display Units (CDUs) generally. Specifically, embodiments of avionic displays 112 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface is implemented as an integration of a user input interface 114 and a display unit 110. In various embodiments, the display unit 110 is a touch screen display. In various embodiments, the human-machine interface also includes a separate user input device 108 (such as a keyboard, cursor control device, voice input device, or the like), generally operationally coupled to the display unit 110. Via various display and graphics systems processes, the controller circuit 104 may command and control a touch screen display unit 110 to generate a variety of graphical user interface (GUI) objects or elements described herein, including, for example, buttons, sliders, and the like, which are used to prompt a user to interact with the human-machine interface to provide user input; and for the controller circuit 104 to activate respective functions and provide user feedback, responsive to received user input at the GUI element.

With continued reference to FIG. 1, in various embodiments, the controller circuit 104 may include a processor 130 and a memory 132. Memory 132 is a data storage that can encompass any number and type of storage media suitable for storing computer-readable code or instructions, such as the aforementioned software program 134, as well as other data generally supporting the operation of the system 102. Memory 132 may also store one or more preprogrammed variables 136 and thresholds, for use by an algorithm embodied in the software program 134. Examples of preprogrammed variables 136 include the "snap-to start" and "snap-to end" percentages described below. One or more database(s) 138 are another form of storage media that the system 102 may employ; they may be integrated with memory 132 or separate from it.

In various embodiments, aircraft-specific parameters and information for aircraft 100 may be stored in the memory 132 or in a database 138 and referenced by the program 134. Non-limiting examples of aircraft-specific information includes an aircraft weight and dimensions, performance capabilities, configuration options, and the like.

In various embodiments, two- or three-dimensional map data may be stored in a database 138, including airport features data, geographical (terrain), buildings, bridges, and other structures, street maps, and navigational databases, which may be updated on a periodic or iterative basis to ensure data timeliness. This map data may be uploaded into the database 138 at an initialization step and then periodically updated, as directed by either a program 134 update or by an externally triggered update.

Figure 2:
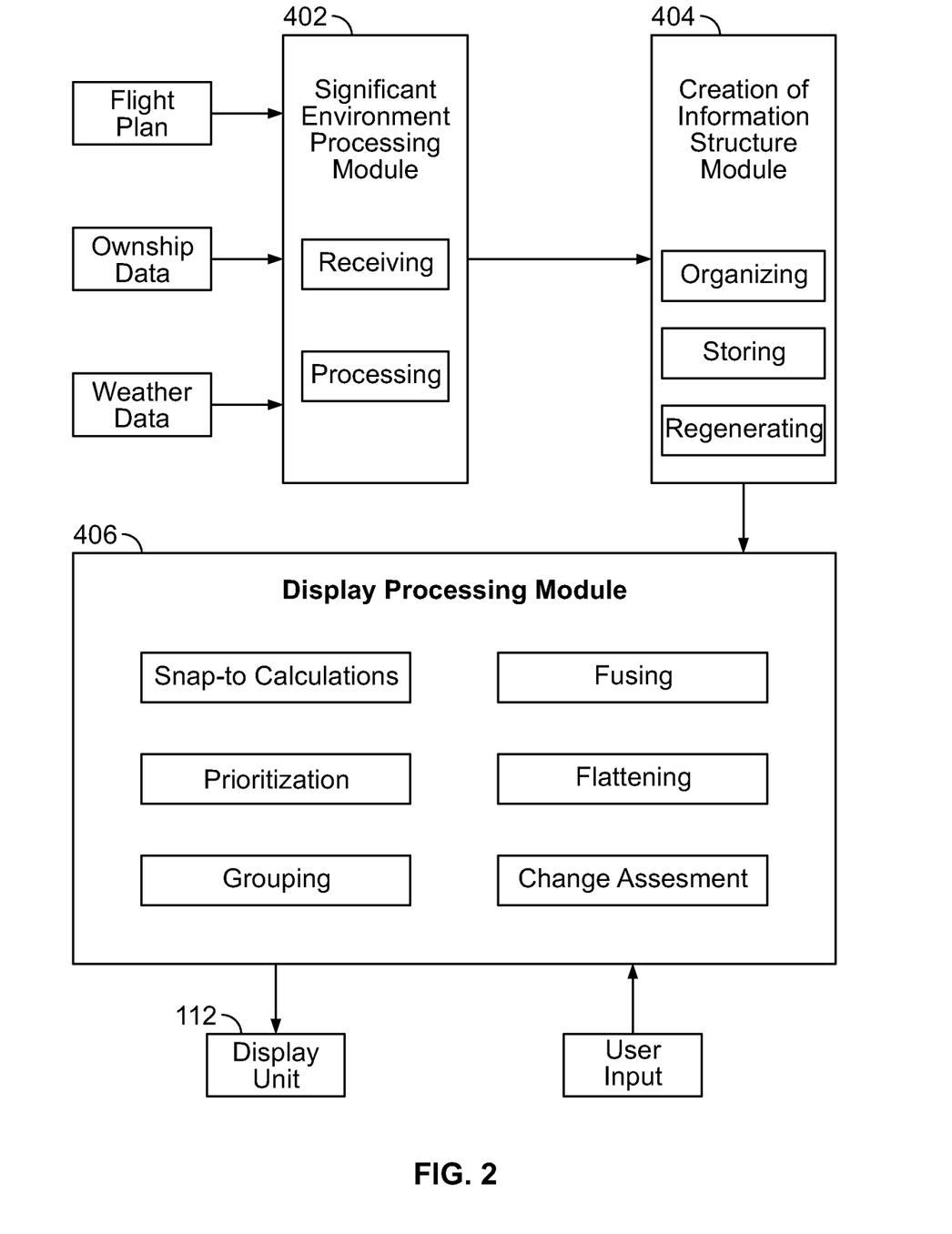
FIG. 2 is an architectural block diagram of one or more modules operating in a system for presenting environment information on a mission timeline on an aircraft display system, as illustrated in accordance with an exemplary embodiment of the present disclosure.

We turn now to processes performed by the system 102. With reference to FIG. 2, the system 102 may be described in terms of an architecture with one or more processing modules. A significant environment processing module 402 may be configured to perform a process of determining or identifying a weather phenomenon that is relevant to the flight plan (FP) of the aircraft 100. The significant environment processing module 402 may be configured to identify the weather phenomenon that impacts the FP by processing weather data received from at least one weather source, referencing the flight plan (FP) of the aircraft, and referencing/receiving real-time aircraft state data, aircraft system status data, and an aircraft configuration. In this processing step, the significant environment processing module 402 may apply rules embodied in the program 134 to assess the significance of weather data based on the aircraft state data (static and dynamic), current FP, and system statuses, as well as configured preferences.

In various embodiments, the output of significant environment processing module 402 may be a data set of occurrences of environmental events with significant impact on the FP. This data set is generated to be universally useful to aircraft applications and does not need to be further altered for a specific use of any application, but contains the detailed data on the occurrence, its type, its extent/duration and location.

A creation of information structure module 404 may be configured to organize and store the output from module 402 into an information structure. The creation of information structure module 404 may perform a process of creating an information structure for the identified weather phenomenon that impacts the flight plan (FP) of the aircraft, the information structure is constructed using predefined rules, thresholds and variables in the program 134. Table 1, below, provides an exemplary embodiment of an information structure created by system 102, although placing information into a table is not a necessary step in the generation of the information structure.

TABLE 1

Information Structure

| | Name | Description |
|---|---|---|
| 1 | ID | Unique Identification number of the occurrence providing the means of cross-application referencing and linking |
| 2 | Title | Title providing high-level description of the occurrence (e.g. Icing) |
| 3 | Description | Additional detail of the occurrence (e.g. Forecast of extreme icing, 6:00Z-9:00Z) |
| 4 | Type | Enumeration (e.g. weather, airspace, traffic) |
| 5 | Subtype | Enumeration (e.g. Turbulence, Icing, Lightning) |
| 6 | Severity | Severity of the subtype (e.g. light/moderate/Severe) |
| 7 | Impact distance start | Start of the impacted trajectory segment, measured in nautical miles from the trajectory destination. |
| 8 | Impact distance finish | Finish of the impacted trajectory segment measured in nautical miles from the trajectory destination. |
| 9 | Impact top | Highest impacted flight level |
| 10 | Impact bottom | Lowest impacted flight level |
| 11 | Valid from | Date/time beginning of the occurrence validity |
| 12 | Valid to | Date/time end of the occurrence validity |
| 13 | Source | Identification of the data source (multiple sources can provide the same information) |

As mentioned, the information structure output of the system 102 may be automatically and without further user input produced as a single source to be consumed by all aircraft applications/functions providing significant environment information to the pilot or performing calculations based on the significant environment information data. The system 102 may regenerate the information structure output, or have a refresh interval, responsive to an update in received data from any one of the data sources feeding into the system 102. As used herein, an update in received data implies a change in at least one item of the received data (e.g., a change in weather information, or a change in a system status). In various embodiments, the information structure includes at least a type (Row 4), a subtype (Row 5), a severity (Row 6), a start of impact (Row 7) and an end of impact (Row 8).

In various embodiments, the system 102 may perform a process of change assessment, responsive to receipt of an update to received data. One kind of change assessment that the system 102 may perform includes new occurrence alerting, which means alerting to a new occurrence when a weather event occurrence is present in the new (i.e., regenerated) data set at a location that does not have any overlap with an occurrence of the same type (Row 4) from the previous data set. Another kind of change assessment that the system 102 may perform includes a severity escalation, meaning, alerting to an occurrence of an increased severity (row 6) when a new data set that has a partial or complete overlap with the previous data set, has an increased severity. The change assessment may take the form of an alphanumeric notice rendered on the mission timeline at a location that is representative of the data change.

As mentioned, the system 102 may have a display processing module configured to determine how to present the information embodied in the information structure, generally, using display techniques and indicators (e.g., a weather event indicator described below), alphanumeric notices, color rendering, and the like. A display processing module 406 may be configured to operate on the information structure and parse/filter/conform relevant information therefrom to a mission timeline displayed on a specific display unit 110, as described herein.

An aspect of determining how to present this information includes referencing a mission timeline that is currently displayed, and further identifying which flight segments and how many flight segments currently displayed on the mission timeline display are affected by a weather event in terms of its extent and predicted duration on a flight plan. An aspect of presenting the information includes scaling the display techniques and indicators, alphanumeric notices, color rendering, and the like, to conform to the currently displayed mission timeline, as described in more detail below.

Figure 3:
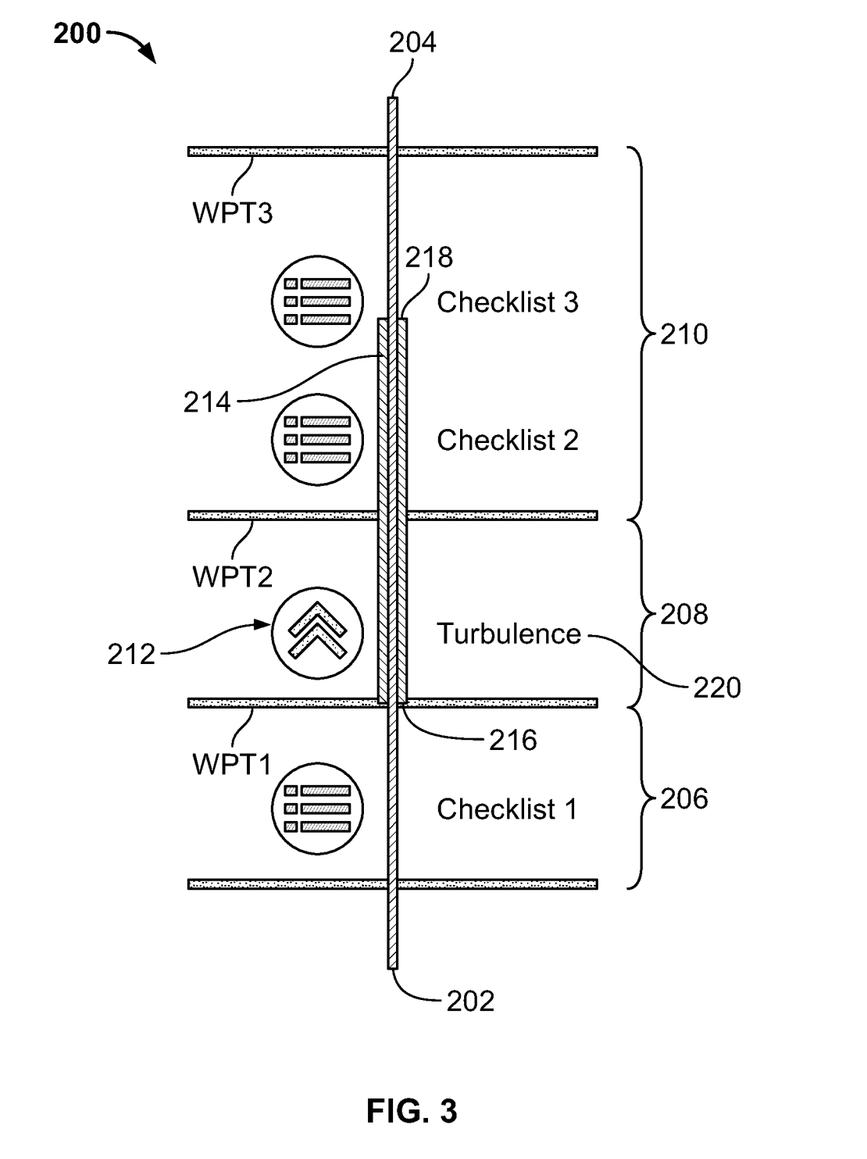
FIGS. 3-4 illustrate various embodiments of a weather event indicator presented on a mission timeline, in accordance with an exemplary embodiment of the present disclosure.

Turning now to FIG. 3, an example of a weather event with its extent and associated duration displayed on a mission timeline is illustrated. The image 200 may be presented on a display 112. A mission timeline is depicted extending vertically from 202 at the bottom of the image to 204 at the top of the image; the aircraft 100 generally has a current position at about 202. Waypoint 1 (WPT1), Waypoint 2 (WPT2) and Waypoint 3 (WPT3) are shown, dividing up the displayed mission timeline into a first flight segment 206 (prior to WPT1), a second flight segment 208 (between WPT1 and WPT2) and a third flight segment 210 (from WPT2 to WPT3). In some available systems, a weather event symbol (such as symbol 212) may be placed alongside the mission timeline in a time-relevant segment. In FIG. 3, symbol 212 is shown placed within the second segment 208; as can be observed, the symbol 212 does not convey relevant details, such as severity, start of impact or end of impact.

The system 102 improves upon existing mission timeline displays by presenting a weather event indicator 214, overlaid on the mission timeline, to depict the weather phenomenon. A length of the weather event indicator 214, and its start and end, are dynamic and designed to visually convey on the mission timeline the start, the extent/duration, and end time of the respective weather phenomenon. In the example embodiment of FIG. 3, the weather event indicator 214 is a thickened line overlaid on the mission timeline, the thickened line is rendered in a first color (or first shade, when using gray scale) that is different from a second color (or second shade, when using grey scale) that the mission timeline is rendered in, and the first color is lighter than the second color, such that the mission timeline is viewable through the weather event indicator 214. The system also presents an alphanumeric notice 220 of the weather event next to the weather event indicator. In FIG. 3, the alphanumeric notice 220 is placed on the right side of the mission timeline, in the second flight segment 208, which is where the weather event has been determined to begin.

Figure 4:
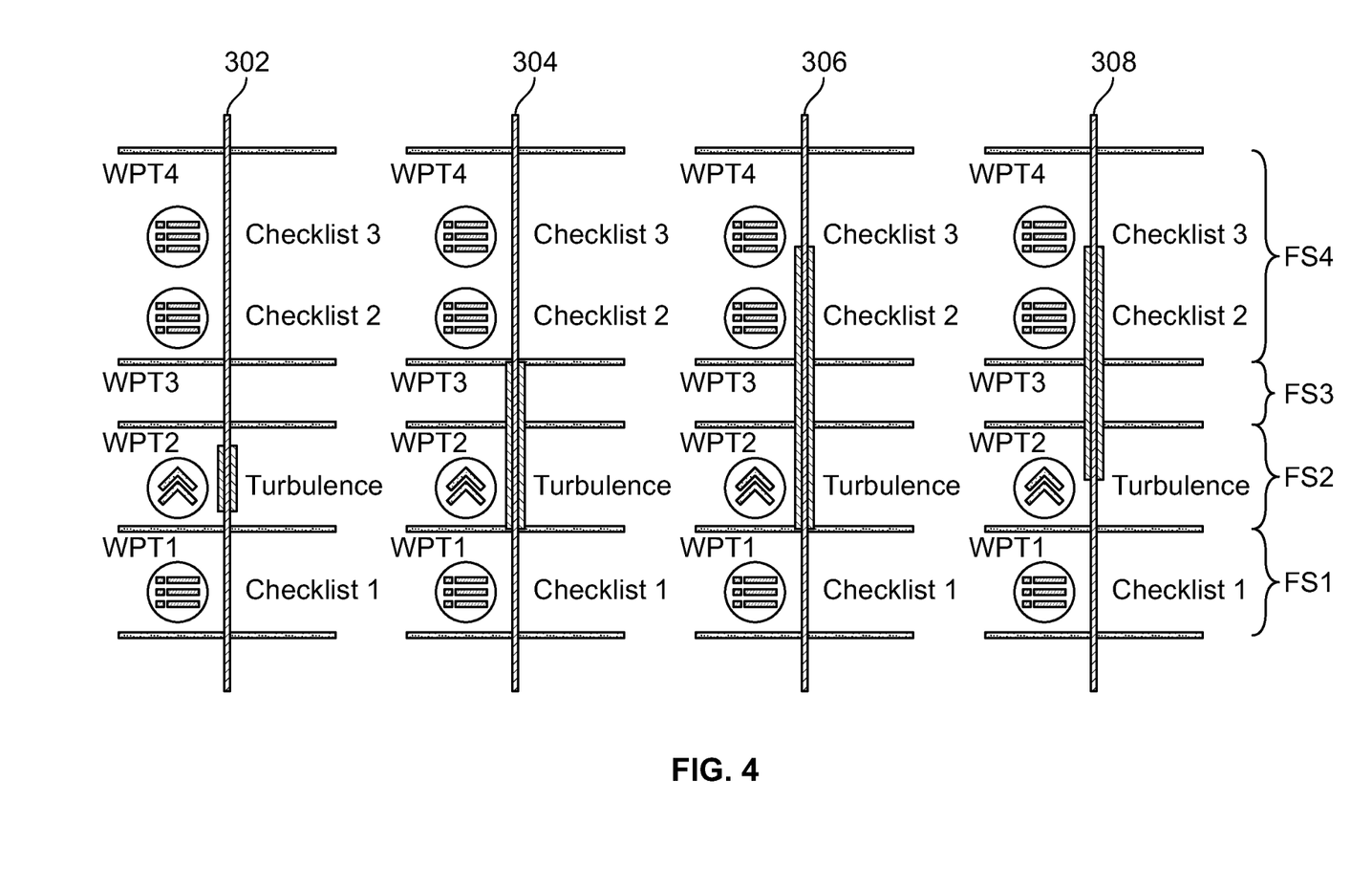

It is to be appreciated that while the mission timelines are not rendered to scale in FIGS. 3 and 4, they are sized to sufficiently communicate relative distances between the flight segments. The extent of a weather event and its associated duration on the mission timeline is also visually conveyed by system 102 in a relative manner, as follows. A beginning 216 of the weather event indicator and an end 218 of the weather event indicator convey an extent of the weather event to a viewer; the extent of the weather event is experienced as a duration in the sense that the aircraft is predicted to experience the weather event for the duration of time it flies the mission timeline from the beginning 216 of the weather event indicator to the end 218. In FIG. 3, the beginning 216 aligns with the beginning of the second flight segment 208 (which is also a location of WPT1), and the end 218 is shown midway in the third flight segment 210 (between WPT2 and WPT3). The specific beginning and ending for a given weather event indicator are determined by the rules in the program 134. In various embodiments, a "snap-to" percent is employed, as follows.

With reference to FIG. 4, and with continued reference to FIGS. 1-3, the extent of the weather event indicator 214 is described. Note that there are four sequential flight segments, labeled FS1, FS2, FS3 and FS4, and that the flight segments extend between waypoints, as described above, and each flight segment is not the same size or distance.

In a simple example, the weather event could be determined to start exactly at one waypoint and end exactly at another waypoint, in which case no further extent/duration processing would be required. However, when the start or end is in between waypoints, the system 102 applies predetermined rules for showing the extent (and associated predicted duration). In a pre-processing step, the system 102 (e.g., via the display processing module 406) may calculate the distance associated with each flight segment and determine a distance that is equal to a snap-to start percent and a distance that is equal to a snap-to end percent for each of the flight segments. For example, if a flight segment is 100 nautical miles (NM) long, and the snap-to start is 15%, the system 102 will be determining whether weather events start prior to the first 15 NM of that flight segment; likewise, if the snap-to end is 90%, the system 102 will be determining whether the weather event ends prior to the last 10 NM of the flight segment.

In a first example, when the start of impact occurs at or within a prescribed snap-to start percent of the flight segment, the weather event indicator is aligned with the beginning of a flight segment. This example is depicted in FIG. 4, on mission timelines 304 and 306 (note in each case the weather event indicator begins at the beginning of FS2, which visually conveys that the weather event starts (from the perspective of traveling toward it) within the first prescribed snap-to start percent of the flight segment FS2.

In other example, as depicted on timeline 302, the beginning of the weather event indicator is placed after the beginning of the flight segment when (i) the start of impact occurs after the first prescribed snap-to start percent of the flight segment (ii) the end of the weather event indicator occurs prior to a last prescribed snap-to end percent of the flight segment. On timeline 302, the weather event occurs entirely within FS2.

In another example, as depicted on timeline 308, the beginning of the weather event indicator is placed at a center (i.e., midpoint) of the flight segment when the start of impact occurs after the first prescribed snap-to percent of the flight segment. In an embodiment, the end of the weather event indicator is aligned with an ending of the flight segment when the end of impact occurs at or within to a final prescribed snap-to end percent of the flight segment (as shown on the mission timeline 304). In an embodiment, the end of the weather event indicator is placed at the center of the flight segment (as shown on mission timeline 308) or before the ending of the flight segment (as shown on mission timeline 302) when the end of impact occurs prior to the last prescribed snap-to end percent of the flight segment.

When comparing mission timeline 302 and mission timeline 308, the determiner on where the end 218 of the weather event indicator 214 is placed has to do with whether the end of the weather event is in the same flight segment as the beginning (as it is in mission timeline 302) or in a different flight segment (as it is in mission timeline 308). With respect to mission timeline 308, the above processes may be expanded as follows. The flight segment is one of two or more flight segments displayed on the mission timeline 308, and the controller is further configured to: identify a start flight segment corresponding to the beginning of the weather event; identify a stop flight segment corresponding to the end of the weather event; and wherein: the beginning of the weather event indicator is aligned with a beginning of the start flight segment when the start of impact occurs at or within the prescribed snap-to start percent of the flight segment; the beginning of the weather event indicator is placed after the beginning of the start flight segment when the start of impact occurs after the prescribed snap-to start percent of the flight segment; the end of the weather event indicator is aligned with an ending of the stop flight segment when the end of impact occurs after the prescribed snap-to end percent of the end of the flight segment; and the end of the weather event indicator is placed after the beginning of the weather event indicator and before the ending of the stop flight segment when the end of impact occurs at or before the prescribed snap-to end percent of the end of the flight segment.

As may be appreciated, more than one weather phenomena may be indicated by the weather data. In various embodiments, the weather phenomenon is one of a plurality of weather phenomena and the system 102 is further configured to: identify the plurality of weather phenomena. The system creates, for each of the plurality of weather phenomena, a respective information structure, and also identifies a respective weather interval for each of the plurality of weather phenomenon, the weather interval extending from a respective start of impact to a respective end of impact. As each weather phenomenon may have its own interval, on occasion, they may overlap.

The system 102 is configured to respond differently based on user selected (via user input device 108) or preprogrammed options for display processing submodules. In various embodiments, the system 102 (e.g., in the display processing module 406) may apply a prioritization scheme in instances of weather phenomena having overlapping weather intervals in a given flight segment. In various embodiments, the system 102 may employ the prioritization scheme to overlay on the mission timeline a weather event indicator that depicts only a weather phenomenon with the highest priority in the prioritization scheme. In an embodiment, the prioritization scheme may be preprogrammed into the rules in the program 134. In an embodiment, the prioritization scheme may be a function of the system 102, in which the system 102 processes aircraft sensor data or aircraft system status data (such as an amount of fuel) with at least the weather data.

In various embodiments, the display processing module 406 of the system 102 may be configured to, instead of prioritizing, group weather phenomenon together and generate a weather event indicator and an alphanumeric notice of the weather event that represent the grouped weather phenomenon.

In various embodiments, wherein the weather phenomenon is one of a plurality of weather phenomena the display processing module 406 of the system 102 may be configured to: identify the plurality of weather phenomena; for each of the plurality of weather phenomena, create a respective information structure, and identify a weather interval extending from the start of impact to the end of impact; and, apply a fusion scheme to fuse incidents of a same subtype weather phenomena having weather intervals that overlap in the flight segment.

In various embodiments, the display processing module 406 of the system 102 may be configured to flatten some of the information in the information structure, using various fusion schemes. In an embodiment, the system 102 may combine type and subtype (e.g., all thunderstorm-related). In an embodiment, the system 102 combine subtype and severity (e.g. only a weather type). In another embodiment, the system 102 may combine all weather events that have a same level of severity. In various embodiments, wherein the weather phenomenon is one of a plurality of weather phenomena the system 102 is further configured to: identify the plurality of weather phenomena; for each of the plurality of weather phenomena, create a respective information structure, and identify a weather interval extending from the start of impact to the end of impact; and, apply a fusion scheme to fuse incidents of a same subtype weather phenomena having weather intervals that overlap in the flight segment. In other embodiments, any combination of the above fusion schemes may be employed.

In various embodiments, the system 102 may determine that a short distance exists between two similar weather phenomena. In such cases, the system 102 may compare the distance to a threshold, and if it is smaller than the threshold, the system 102 may fuse the two weather phenomena, such that the resulting weather event indicator extends from the beginning of the first one to the ending of the second one.

The examples provided with respect to FIGS. 3 and 4 show the mission timeline displayed in increments that are flight segments separated by waypoints. In other embodiments, the mission timeline may be displayed in nonlinearly time-mapped flight segments. In other embodiments, the techniques and processes described above can be applied to smaller intervals than a flight segment. For example, a flight plan can be broken into intervals of any predefined length and the above processing can be applied to an interval in the same manner as it was applied to a flight segment. For example, a single flight segment might comprise four intervals, and the snap-to percentages and other display processing techniques described above can be applied to each interval. In various embodiments, the choice of interval or flight segment is based at least in part on the device selected for the display unit 110.

Figure 5:
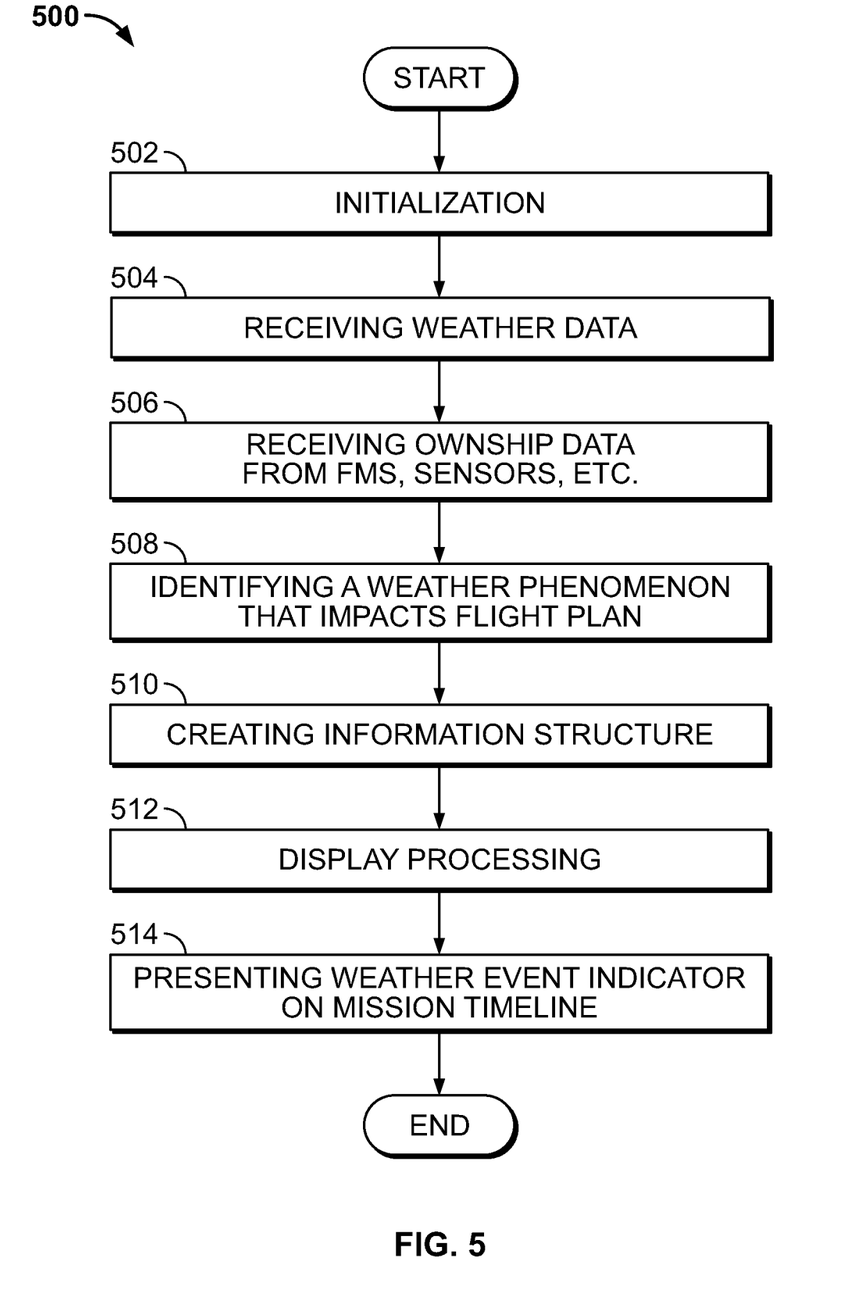
FIG. 5 is a flow chart of a method for displaying environment information on a mission timeline, as may be implemented by the system of FIG. 1, in accordance with an exemplary embodiment of the present disclosure.

Turning now to FIG. 5, the system 102 described above may be implemented by a processor-executable method 500. For illustrative purposes, the following description of method 500 may refer to elements and modules mentioned above in connection with FIGS. 1-2. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

At 502, the system 102 is initialized. Initialization may include loading instructions and program 134 into a processor within the controller circuit 104, as well as loading preprogrammed variables 136, map data, and aircraft-specific features into one or more database(s) 138.

At 504 the system 102 receives weather data from at least one weather source. At 506, the system receives or references ownship data from onboard data sources. The ownship data includes FMS data, such as the flight plan (FP), aircraft state data from the geospatial sensors 118, system status data, such as fuel status and an aircraft configuration, and optionally, onboard weather radar data. At 508, the system 102 performs processing steps to identify one or more weather phenomenon that impacts the FP. At 510, the system creates an information structure for the weather phenomenon. At 512, the system 102 performs display processing to generate the weather event indicator and determine where on the displayed mission timeline its start and end will be. At 512, the system 102 also determines what alphanumeric notices to post alongside the weather event indicator. At 514, the system 102 presents the weather event indicator on the mission timeline displayed on the display unit 110. Block 510 may be repeated for each weather phenomenon identified in block 508.

Thus, enhanced systems and methods for displaying weather information on a mission timeline display are provided. By processing the weather data with the aircraft-specific ownship data (from ownship sources 106), the system 102 is able to not only detect that a weather event is ahead, but to put weather data into context for the pilot, on an easy to comprehend visual, providing an objectively improved human-machine interface.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program or software application that includes program 134) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

The invention claimed is:

1. A flight plan (FP) display system on an aircraft for automating processes of receiving, prioritizing, and grouping weather data into a weather event with an associated extent for presentation on a displayed mission timeline, the mission timeline comprising two or more flight segments, and the system comprising a controller circuit with a processor configured by programming instructions on non-transient computer readable media, the controller circuit configured to:

receive weather data from at least one weather source;
reference aircraft state data and aircraft system status data; and
identify a weather phenomenon that impacts the FP by processing the weather data with the aircraft state data, the aircraft system status data, and the FP;
create an information structure for the weather phenomenon, the information structure including a type, a subtype, a severity, a start of impact and an end of impact;
present a weather event indicator overlaid on the mission timeline to depict the weather phenomenon;
present an alphanumeric notice of a weather event next to the weather event indicator;
depict an extent of the weather event with a beginning of the weather event indicator and an end of the weather event indicator;
identify a start flight segment corresponding to the beginning of the weather event; and
identify a stop flight segment corresponding to the end of the weather event,
wherein:
the beginning of the weather event indicator is aligned with a beginning of the start flight segment when the start of impact is less than or equal to a prescribed snap-to start percent of the beginning of the start flight segment;
the beginning of the weather event indicator is placed after the beginning of the start flight segment when (i) the start of impact is greater than the prescribed snap-to start percent of the beginning of the start flight segment and (ii) the end of impact is less than a prescribed snap-to end percent of an end of the start flight segment;
the beginning of the weather event indicator is placed at a center of the start flight segment when the start of impact occurs after the prescribed snap-to start percent of the beginning of the start flight segment;
the end of the weather event indicator is aligned with an ending of the stop flight segment when the end of impact is greater than or equal to a prescribed snap-to end percent of the ending of the stop flight segment; and
the end of the weather event indicator is placed at a center of the stop flight segment or before the ending of the stop flight segment when the end of impact is less than the prescribed snap-to end percent of the ending of the stop flight segment.

2. The FP display system of claim 1, wherein the at least one weather source includes an external weather system and an on-board weather radar system.

3. The FP display system of claim 1, wherein the controller circuit is further configured to: regenerate the information structure responsive to a change in the weather data from the at least one weather source.

4. The FP display system of claim 3, wherein the weather phenomenon is one of a plurality of weather phenomena and the controller circuit is further configured to:
identify the plurality of weather phenomena;
for each of the plurality of weather phenomena, create a respective information structure, and identify a respective weather interval extending from the start of impact to the end of impact;
apply a prioritization scheme to the plurality of weather phenomena with weather intervals that overlap in the flight segment; and
wherein the weather event indicator overlaid on the mission timeline depicts the weather phenomenon of the plurality of weather phenomena with a highest priority in the prioritization scheme.

5. The FP display system of claim 4, wherein the prioritization scheme is a function of an aircraft system status provided by on-board sensors.

6. The FP display system of claim 3, wherein the weather phenomenon is one of a plurality of weather phenomena and the controller circuit is further configured to:
   identify the plurality of weather phenomena;
   for each of the plurality of weather phenomena, create a respective information structure, and identify a weather interval extending from the start of impact to the end of impact;
   apply a fusion scheme to fuse incidents of a same type weather phenomena having weather intervals that overlap in the flight segment; and
   wherein the weather event indicator overlaid on the mission timeline depicts the type of weather phenomenon.

7. The FP display system of claim 3, wherein the weather phenomenon is one of a plurality of weather phenomena and the controller circuit is further configured to:
   identify the plurality of weather phenomena;
   for each of the plurality of weather phenomena, create a respective information structure, and identify a weather interval extending from the start of impact to the end of impact;
   apply a fusion scheme to fuse incidents of a same subtype weather phenomena having weather intervals that overlap in the flight segment; and
   wherein the weather event indicator overlaid on the mission timeline depicts the subtype of weather phenomenon.

8. A method for automating processes of receiving, prioritizing, and grouping weather data into a weather event with an associated extent for presentation on a displayed mission timeline in an aircraft having a flight plan (FP), the mission timeline comprising two or more flight segments, and the method comprising:
   receiving, by a controller circuit with a processor configured by programming instructions, weather data from at least one weather source;
   referencing, by the controller circuit, aircraft state data and aircraft system status data; and
   identifying, by the controller circuit, a weather phenomenon that impacts the FP by processing the weather data with the aircraft state data, the aircraft system status data, and the FP;
   creating an information structure for the weather phenomenon, the information structure including a type, a subtype, a severity, a start of impact and an end of impact;
   presenting a weather event indicator overlaid on the mission timeline to depict the weather phenomenon;
   presenting an alphanumeric notice of the weather event next to the weather event indicator;
   depicting an extent of the weather event with a beginning of the weather event indicator and an end of the weather event indicator;
   identifying a start flight segment corresponding to the beginning of the weather event; and
   identifying a stop flight segment corresponding to the end of the weather event,
   wherein:
      the beginning of the weather event indicator is aligned with a beginning of the start flight segment when the start of impact is less than or equal to a prescribed snap-to start percent of the beginning of the start flight segment;
      the beginning of the weather event indicator is placed after the beginning of the start flight segment when (i) the start of impact is greater than the prescribed snap-to start percent of the beginning of the start flight segment and (ii) the end of impact is less than a prescribed snap-to end percent of an end of the start flight segment;
      the beginning of the weather event indicator is placed at a center of the start flight segment when the start of impact occurs after the prescribed snap-to start percent of the beginning of the start flight segment;
      the end of the weather event indicator is aligned with an ending of the stop flight segment when the end of impact is greater than or equal to the prescribed snap-to end percent of the ending of the stop flight segment; and
      the end of the weather event indicator is placed at a center of the stop flight segment or before the ending of the stop flight segment when the end of impact is less than the prescribed snap-to end percent of the ending of the stop flight segment.

9. The method of claim 8, wherein the at least one weather source includes an external weather system and an on-board weather radar system.

10. The method of claim 8, wherein the controller circuit is further configured to: regenerate the information structure responsive to a change in the weather data from the at least one weather source.

11. The method of claim 10, wherein the weather phenomenon is one of a plurality of weather phenomena and the controller circuit is further configured to:
   identify the plurality of weather phenomena;
   for each of the plurality of weather phenomena, create a respective information structure, and identify a respective weather interval extending from the start of impact to the end of impact;
   apply a prioritization scheme to the plurality of weather phenomena with weather intervals that overlap in the flight segment; and
   wherein the weather event indicator overlaid on the mission timeline depicts the weather phenomenon with a highest priority.

12. The method of claim 11, further comprising, basing the prioritization scheme on an aircraft system status provided by on-board sensors.

13. The method of claim 10, wherein the weather phenomenon is one of a plurality of weather phenomena and further comprising:
   identifying the plurality of weather phenomena;
   for each of the plurality of weather phenomena, creating a respective information structure, and identifying a respective weather interval extending from the start of impact to the end of impact;
   applying a fusion scheme to fuse incidents of a same type weather phenomena having weather intervals that overlap in the flight segment; and
   wherein the weather event indicator overlaid on the mission timeline depicts the type of weather phenomenon.

14. The method of claim 10, wherein the weather phenomenon is one of a plurality of weather phenomena and further comprising:

identifying the plurality of weather phenomena;
for each of the plurality of weather phenomena, creating a respective information structure, and identifying a weather interval extending from the start of impact to the end of impact;
applying a fusion scheme to fuse incidents of a same subtype weather phenomena having weather intervals that overlap in the flight segment; and
wherein the weather event indicator overlaid on the mission timeline depicts the subtype of weather phenomenon.

15. A mission timeline display system displaying a mission timeline for a flight plan (FP) of an aircraft, comprising:
a significant environment processing module configured to:
communicate with aircraft ownship data sources and external data sources using a communications circuit; and
identify a weather phenomenon that impacts the FP;
a creation of information structure module configured to operate on the weather phenomenon and create an information structure therefrom; and
a display processing module configured to operate on the information structure to generate and display on the mission timeline display:
a weather event indicator, overlaid on the mission timeline to depict the weather phenomenon; and
an alphanumeric notice of a weather event, next to the weather event indicator; and
wherein the weather event has an extent indicated with a beginning of the weather event indicator and an end of the weather event indicator;
wherein:
the beginning of the weather event indicator is aligned with a beginning of a flight segment when a start of impact occurs at or within a first prescribed snap-to start percent of the flight segment;
the beginning of the weather event indicator is placed after the beginning of the flight segment when (i) the start of impact occurs after the first prescribed snap-to start percent of the flight segment and (ii) the end of the weather event indicator occurs prior to a last prescribed snap-to end percent of the flight segment;
the beginning of the weather event indicator is placed at a center of the flight segment when the start of impact occurs after the prescribed snap-to start percent of the flight segment;
the end of the weather event indicator is aligned with an ending of the flight segment when the end of impact occurs at or within a final prescribed snap-to end percent of the flight segment; and
the end of the weather event indicator is placed at the center of the weather event indicator or before the ending of the flight segment when the end of impact occurs prior to the last prescribed snap-to end percent of the flight segment.

16. The mission timeline display system of claim 15, wherein the display processing module is further configured to calculate a distance associated with the flight segment, a distance that is equal to the snap-to start percent of the flight segment, and a distance that is equal to the snap-to end percent of the flight segment.

17. The mission timeline display system of claim 16, wherein:
the significant environment processing module configured to identify a plurality of weather phenomena that impacts the FP; and
the display processing module is further configured to apply a prioritization scheme in instances of the plurality of weather phenomena having overlapping weather intervals in the flight segment.

18. The mission timeline display system of claim 17, wherein:
the display processing module is further configured to apply a fusion scheme to fuse incidents of a same subtype weather phenomena having weather intervals that overlap in the flight segment.

* * * * *